United States Patent [19]
Gusdorf et al.

[11] 3,742,870
[45] July 3, 1973

[54] ARTICLE OF FURNITURE
[75] Inventors: Walter Gusdorf; Charles Francis Camilleri, both of St. Louis, Mo.
[73] Assignee: Gusdorf & Sons, Inc., St. Louis, Mo.
[22] Filed: Feb. 2, 1972
[21] Appl. No.: 222,906

[52] U.S. Cl............... 108/150, 248/158, 108/139, 248/415
[51] Int. Cl........................................ A47b 13/02
[58] Field of Search................... 108/139, 150, 158, 108/161; 248/158, 159, 415; 287/20 R; 52/724, 725, 727, 728; 5/279 D

[56] References Cited
UNITED STATES PATENTS
1,222,739 4/1917 De Chime........................... 248/158
1,394,070 10/1921 Diffany............................... 248/158
2,276,588 3/1942 Michelson........................ 248/415 X
3,200,554 8/1965 Goodman et al. .................... 52/727

Primary Examiner—James C. Mitchell
Attorney—Frederick M. Woodruff et al.

[57] ABSTRACT

An article of furniture in which a load bearing top platform, a supporting column assembly, and a base for the column assembly are constructed for knockdown assembly. The column assembly consists of a plastic sheath molded onto a metal reinforcing sleeve in a manner to obtain a secure grip and the sleeve is formed to prevent possible slippage of the sheath and to engage the base in load bearing relation so that the column assembly and base act as a unit assembly.

10 Claims, 6 Drawing Figures

PATENTED JUL 3 1973

3,742,870

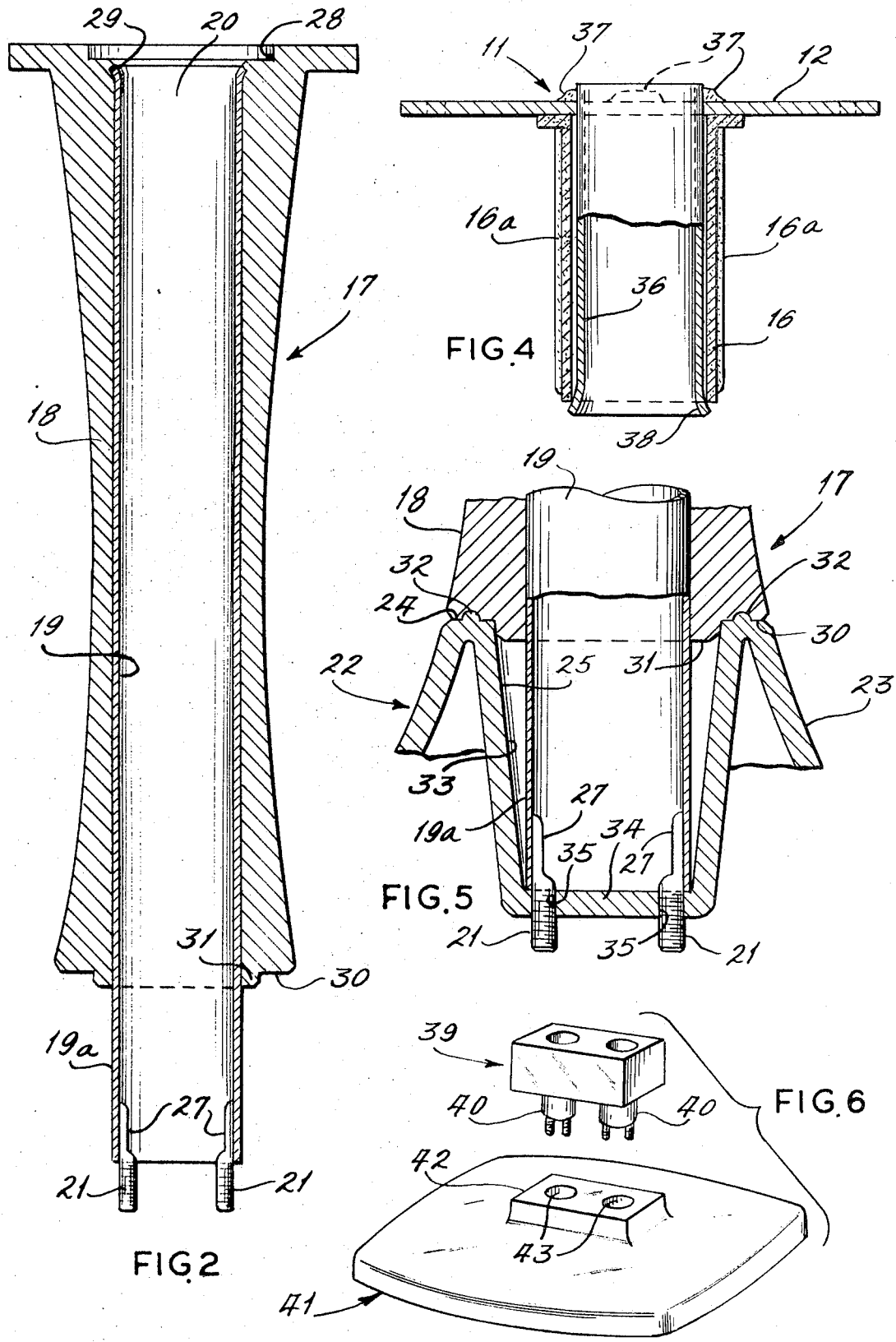

ARTICLE OF FURNITURE

BACKGROUND OF THE INVENTION

This invention relates to improvements in the construction of articles of furniture, and to articles of furniture of knockdown character capable of assembly by the ultimate purchaser.

The art of furniture manufacture has been heretofore largely concentrated in the woodworking field. While wood has been a prime material, the art has slowly advanced in the use of mixtures of wood and metal, and in some types of furniture metal has played an important role. On the other hand plastic materials have been developed which offer good prospects for substituting for wood, except that the knowledge of how to employ plastic substitutes has not been adequately advanced.

It is, therefore, a prime object of this invention to disclose certain improvements in the art of applying plastic materials to substitute for wood as the quality of wood suitable for furniture has been reduced significantly.

The technique of molding plastic materials has advanced to the state where surface finishes can duplicate wood, but the incorporation of plastic into structural components of furniture has not been successful up to now. In the present disclosure plastic material is used successfully when reinforced with metal components so that load bearing capability has been achieved, and unity of assembly is possible. Since plastic materials are generally moldable under heat and varying degrees of pressure, care must be exercised to avoid internal stress and allowances for shrinkage must be observed to be successful.

The present improvement is directed to a new and unique combination of reinforcing plastic material so that the plastic can be made to provide desired surface finish and assume loads so that the use of plastic materials can accomplish what wood has accomplished in the past, thereby effecting economies in the cost of manufacturing furniture and conserving the supply of wood for other uses.

The objects of this invention are to provide improved and unique structural combinations of reinforced plastic components for furniture; to combine plastic material with metal reinforcement so that a substantial unitary component can be obtained; to obtain reinforced plastic components that can be used as load bearing members in furniture; to advance the application of foam molded plastic materials to a wide variety of furniture components; to apply foam molded plastic material as substitutes for wood components in furniture; and to provide a new concept in knockdown furniture construction using plastic components.

A preferred embodiment of the article of furniture comprises a load bearing platform and a base interconnected by a column assembly employing a hollow reinforcing member within an outer molded plastic sheath which are integrated to act as a unit for supporting loads imposed on the platform.

It is also preferred in constructing an article of furniture to form the load bearing member between a top platform and a base with a foamed plastic sheath and a hollow reinforcing sleeve in which the sleeve is seated in a base socket and draws the sheath into substantially solid abutment on the base so as to prevent the possibility of slippage between the sheath and sleeve.

In a form of the invention the article of furniture may be a pedestal stand comprising a load bearing top platform, a molded plastic base having a socket therein opening upwardly, a column assembly having an upper end formed as a socket and a lower end bearing on the base and extending into the base socket, a swivel assembly connected to the platform and having a depending sleeve removably seated in the socket of the column, and detachable means connecting the column extension within the base socket, the whole being constructed for separation into its various components for conservation of bulk in transporting the stand to the ultimate user.

The present article of furniture possesses certain features of construction hereinafter set forth in greater detail relating to presently preferred embodiments, and the disclosure is not intended to impose unnecessary limitations as to usages coming within the scope of the following specification.

BRIEF DESCRIPTION OF THE DRAWINGS

Preferred embodiments of the present invention have been illustrated in the accompanying drawings, wherein:

FIG. 2 is a longitudinal sectional view of the column assembly taken at line 2—2 in FIG. 1;

FIG. 4 is a partial sectional view of the swivel component connecting the load bearing top platform to the column assembly, the view being taken at line 4—4 in FIG. 1;

FIG. 5 is an enlarged and fragmentary sectional view of the assembly of the base and column; and FIG. 6 is a perspective view of another preferred embodiment of a base and column assembly.

DETAILED DESCRIPTION OF THE EMBODIMENTS

Figure 1:
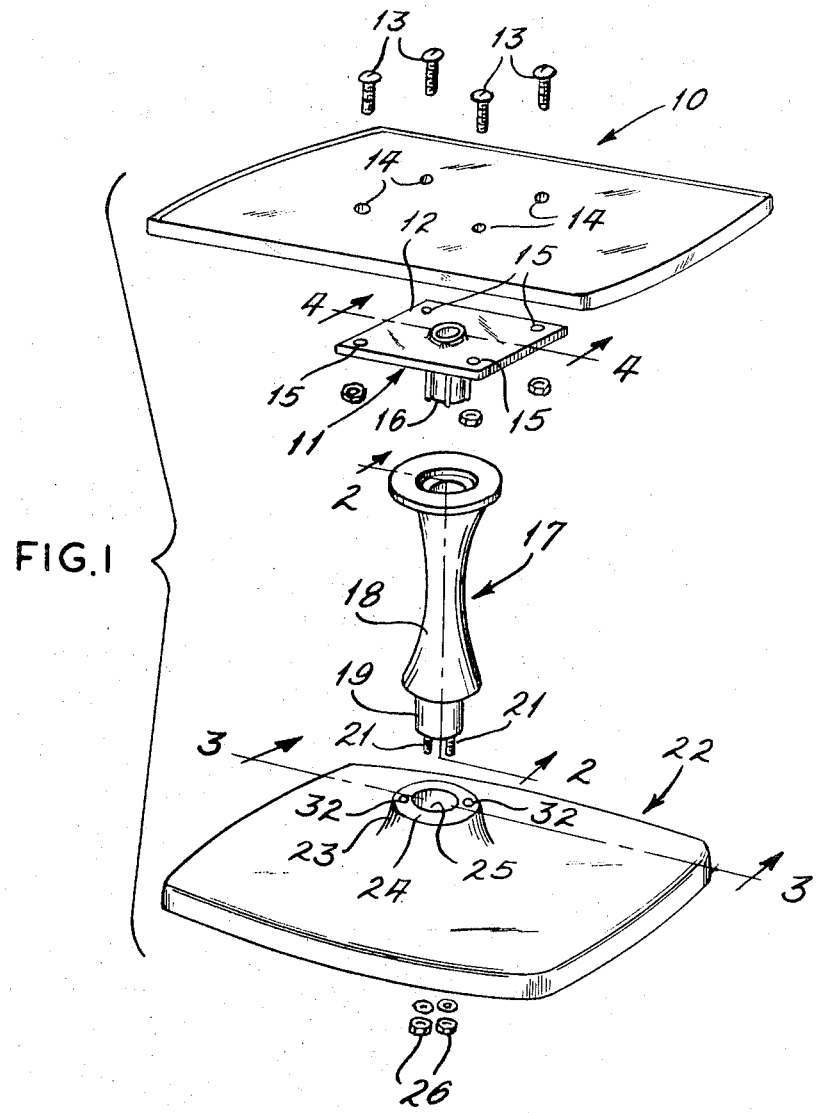
FIG. 1 is an exploded perspective view of one preferred embodiment of an article of furniture in the form of a pedestal stand showing the several components thereof.

Referring to FIG. 1 the article of furniture is presented in the form of a knockdown (KD) assembly comprising a load bearing top platform 10 providing an area for supporting such objects as a television receiver. The top platform 10 is provided with a swivel assembly 11 comprising a plate 12 adapted to be connected to the central area of the top platform 10 by securing means 13 penetrating holes 14 in the platform 10 and matching holes 15 in the plate 12. The plate 12 carries a depending sleeve 16.

A column assembly 17 (FIG. 1) comprises an outer sheath 18 covering a hollow reinforcing sleeve 19 which extends through the sheath 18 from a top end socket 20 to an outwardly extending bottom portion. The bottom end of the sleeve 19 is provided with spaced threaded prongs 21 for securing the column assembly 17 to a base 22. The base 22 is provided with a central raised boss 23 formed with a shoulder 24 surrounding the opening of a socket 25. The extending bottom portion of the reinforcing sleeve 19 is adapted to fit into the socket 25 such that the threaded prongs 21 extend through the bottom of the socket and are secured by nuts 26.

Turning now to FIG. 2, the column assembly 17 is seen to include the sheath 18 having a hollow reinforcing sleeve 19 extending from the socket 20 to a portion 19a extending beyond the bottom end of the sheath 18. At the bottom end of the sleeve portion 19a are a pair of spaced prongs 21, each secured by a flattened end portion 27 to the inside of the hollow sleeve 19 so that the threaded portion projects therebeyond. In constructing the column assembly the hollow reinforcing sleeve 19 formed of a suitable metal is supported in a suitable mold cavity by its projecting end portion 19a and by a mold support forming the socket recess 28. The mold forms a cavity surrounding the sleeve and is of any suitable form such as the tapering form shown. A suitable plastic material, as polystyrene and a foaming agent are injected into the cavity to surround the sleeve 19 and shrink thereon for a tight grip. The end of the sleeve 19 at the socket 20 is formed with a flared projection 29 which extends outwardly to grip the molded sheath and also form a smooth lead-in surface to the socket opening 20. At the opposite lower end of the sheath 18 there is formed a first enlarged shoulder 30 and a second axially projecting shoulder 31 having an outer slightly conical surface of the order of 6°. A simple circular section for the column assembly is shown. However, the sheath 18 may have any desired surface configuration for the style of furniture stand chosen.

The advantage of the column assembly 17 of FIG. 2 is that the hollow reinforcing metal sleeve greatly strengthens the assembly and reduces the amount of plastic material needed. The foaming of the plastic material yields an exact surface configuration of the interior shape of the mold used in its manufacture, and reduces the need for final surface clean-up, except for the removal of the flash formed at the mold parting lines. When the mold surface is configured to simulate a wood grain it is extremely difficult to tell if the column assembly is other than wood when visually inspected.

Figure 3:
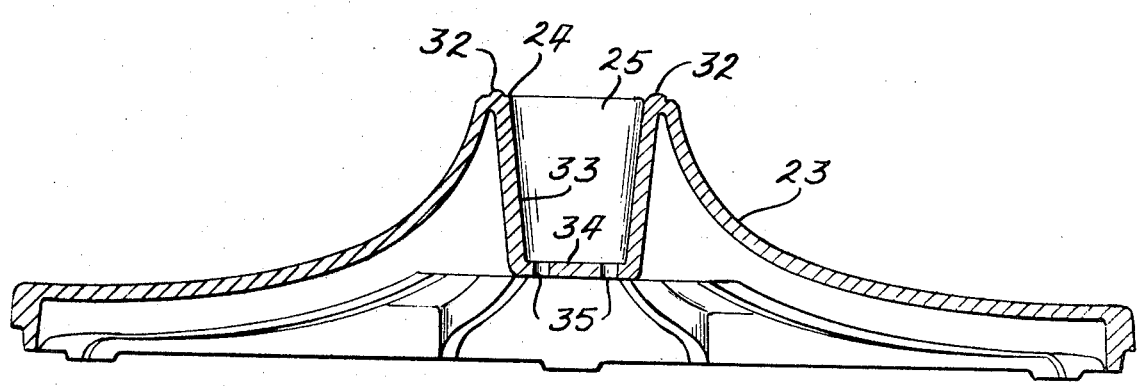
FIG. 3 is a sectional view of the base component taken at line 3—3 in FIG. 1.

In FIG. 3 there is shown the base 22 formed by molding methods to have a wood grain surface finish to match the surface of the column assembly 17 above described. The base 22 is provided with a raised boss 23 contoured to slope upwardly to a shoulder surface 24 encompassing the opening of the socket 25. The shoulder surface 24 is formed with one or more (two being shown) projections 32 which are adapted to bite into the matching shoulder 30 at the bottom end of the column sheath 18 (FIG. 2). The projections 32 prevent noise which may occur when the column assembly 17 is subject to lateral or bending loads, or when the load on the top platform 10 is asymmetrical in nature. The base socket 25 depends from the elevation of the shoulder 24 and is formed with a conical wall 33 having its small diameter at the bottom closure wall 34, The wall 34 is provided with apertures 35 to receive the threaded prongs 21 carried on the projecting end 19a of the reinforcing sleeve 19 in the column assembly 17 (FIG. 2).

In FIG. 5 there is seen the preferred manner for connecting the column assembly 17 to base 22. When the first column sheath shoulder 30 is engaged on the shoulder 24 of the base boss 23, the second shoulder 31 fits into the socket opening 25 so that the taper of the shoulder 31 matches the taper of the conical socket wall 33. The reinforcing sleeve portion 19a is sized to fit the bottom of the conical wall 33 of the base socket, while the threaded prongs 21 extend through the apertures 35 in the bottom wall 34 and prevent turning of the sleeve 19a. The fit of the column assembly 17 in the base socket is such that the shoulders 24 and 30 carry the vertical loads and working motion between these surfaces is checked by the projections 32. The projections 32 may, of course, be formed on either shoulder 30 or 24, though they are shown on surface 24. The second shoulder 31 acts to center the column sheath 18 so that it matches the boss 23 and resists lateral loads. The mounting of the nuts 26 (FIG. 1) on the prongs 21 draws the sleeve 19 down whereby the flared upper end 29 (FIG. 2) of the reinforcing metal sleeve 19 acts to draw the column sheath 18 into tight engagement of its enlarged shoulder 30 on the shoulder 24 of the base boss 23. Also, the flared upper end 29 prevents the molded plastic sheath 18 sliding or creeping relative to the sleeve 19 under temperature variations to which the furniture stand may be subjected.

Turning to FIG. 4, the swivel assembly 11 includes a plate 12 attached as shown in FIG. 1 to the top platform 10. The depending sleeve 16 of the assembly 11 is formed of a suitable plastic material, as Delrin, and is reinforced by an internal metal tube 36 which is projected upwardly through the plate 12 and is secured by welds 37 as shown. The bottom end of the tube 36 is flared at 38 to form means to retain the sleeve 16 when the swivel assembly 11 is withdrawn from the socket 20 of the column assembly 17 (FIG. 1). The use of Delrin for the sleeve 16 allows the assembly 11 to be easily inserted into or removed from the socket 20, and it also allows swivelling of the top platform 10 relative to the column assembly 17. The outer surface of the sleeve 16 may be formed with vertical ribs 16a to reduce the surface contact within the hollow sleeve 19 of the column assembly 17, but such ribs do not detract from the nicety of fit or the swivelling action.

When the article of furniture requires a more massive column assembly than that shown in FIGS. 1 and 2, the preferred alternative is to form the column as is shown in FIG. 6. Here the column assembly 39 is molded with a pair of reinforcing sleeves 40 extending therethrough. The base 41 must be formed with an enlarged boss 42 so that a pair of sockets 43 may be provided. In other respects, the modified assembly of FIG. 6 possesses the same important features heretofore described in connection with the structure of FIGS. 1 to 5 inclusive. Swivelling of the top platform is, however, prevented by the requirement for a pair of depending sleeves on the underside of the platform. The massive size of the column assembly 39 requires the use of two hollow sleeves to reduce the amount of plastic material needed, as well as to meet the need for cooling the plastic material in those areas of greatest thickness or mass. It is also recognized that a single hollow sleeve of an appropriate shape (rectangular, oval, elliptical and the like) may be used in place of the two sleeves as the column assembly 39 increases beyond the convenient size of FIG. 2.

The foregoing description has set forth preferred structural requirements for the improved article of furniture, and the embodiments chosen for presentation herein are those of pedestal stands. Other forms of furniture may come to mind in which the present details of structure of knockdown type furniture may have ready usage.

What is claimed is:

1. An article of furniture comprising a load bearing top platform, a molded plastic base having a socket therein opening toward said platform, a column assembly having an upper end connected to said platform and a lower end engaged on said base at said socket, and means detachably connecting said column lower end within said socket, said column including a molded plastic body having a shoulder at its lower end, metal reinforcing means in said molded plastic body having a portion projecting beyond the lower end of said body and extending into said base socket, said body shoulder engaging with said base socket adjacent said socket opening and said projecting portion of said reinforcing means engaging with said socket adjacent its bottom to resist lateral forces on said column from asymmetric loading on said top platform.

2. The article of furniture of claim 1 wherein said molded plastic body is high impact polystyrene foam molded about said metal reinforcing means, and said metal reinforcing means is formed with a shoulder engaging on said molded plastic body adjacent its upper end.

3. The article of furniture of claim 1 wherein said top platform and column assembly connection includes a depending sleeve attached to said top platform and sized to extend into said column assembly and engaged with said metal reinforcing means, and said metal reinforcing means is formed with socket adjacent the upper end of said column assembly to slidably receive said depending sleeve.

4. The article of furniture of claim 1 wherein said molded plastic body has a second shoulder at its lower end sized to fit within and engage the interior of said socket opening, said projecting portion of said reinforcing means abuts with said socket adjacent its bottom, and said detachable connecting means engages said socket at its bottom and prevents column rotation.

5. In a pedestal stand having a load bearing top platform, a column supporting said top platform, and a base engaged by said column, the improvement of a socket in said base having a conical wall smaller in diameter adjacent its bottom and a shoulder at its open top end, reinforcing sleeve means in said column having a bottom projecting portion extending into said conical socket and engaged with said conical wall adjacent its bottom, said column having a shoulder surrounding said reinforcing sleeve and sized to match said socket shoulder, and means detachably connecting the projecting portion of said projecting sleeve portion to the bottom of said socket and drawing said column shoulder into abutment with said socket shoulder.

6. The improvement of claim 5 wherein said means connecting said column sleeve projecting portion to the bottom of said socket includes spaced threaded prongs extending through said socket bottom to prevent turning of said column relative to said base.

7. The improvement of claim 5 wherein said column is formed with a protuberence on said shoulder sized to extend into the open top of said socket and bear against the conical wall.

8. The improvement of claim 5 wherein said reinforcing sleeve is formed with a shoulder spaced from said bottom projecting portion and engaging with said column.

9. The improvement of claim 5 wherein said one of said column and socket shoulders is formed with spaced projections to bite into the other of said shoulders to maintain said shoulders in alignment.

10. An article of furniture comprising a load bearing top platform, a molded plastic base having a socket therein with an open top and a side wall tapering to a small end at the bottom of the socket, a column assembly being a molded plastic member with a metallic sleeve embedded therein and having an upper end formed as a socket and a lower end extending into said base socket and formed with a shoulder upwardly from the lower end in position engaging on the open top of the socket, a top platform connected means engaged in said upper end socket, the lower end extending into and engaging the base socket adjacent the bottom thereof, and detachable means connecting said lower end of the column assembly within said base socket to retain said column shoulder abutted on said socket open top and said opposite end portion engaged in said base socket to resist lateral forces on said column assembly from asymmetric loading on said top platform.

* * * * *